(12) United States Patent
Ussery

(10) Patent No.: US 7,980,123 B2
(45) Date of Patent: Jul. 19, 2011

(54) TEST STAND WITH JOINTED DRIVE SHAFT

(75) Inventor: Robert Lynn Ussery, Byron, MI (US)

(73) Assignee: Assembly & Test Worldwide, Inc., Dayton, OH (US)

( * ) Notice: Subject to any disclaimer, the term of this patent is extended or adjusted under 35 U.S.C. 154(b) by 1034 days.

(21) Appl. No.: 11/754,109

(22) Filed: May 25, 2007

(65) Prior Publication Data
US 2008/0290247 A1    Nov. 27, 2008

(51) Int. Cl.
*G01M 15/00* (2006.01)
(52) U.S. Cl. ................... 73/116.01; 73/115.01
(58) Field of Classification Search ............... 73/115.01, 73/116.01, 116.02
See application file for complete search history.

(56) References Cited

U.S. PATENT DOCUMENTS

| | | | |
|---|---|---|---|
| 2,565,473 A * | 8/1951 | Cline | 74/16 |
| 4,592,125 A * | 6/1986 | Skene | 29/407.03 |
| 5,576,496 A * | 11/1996 | Carlini et al. | 73/460 |
| 5,877,420 A * | 3/1999 | Moradi et al. | 73/462 |
| 5,893,892 A * | 4/1999 | Loeffler | 701/29 |
| 5,922,952 A * | 7/1999 | Moradi et al. | 73/462 |
| 6,378,374 B2 * | 4/2002 | Kochersberger | 73/593 |
| 6,895,830 B2 * | 5/2005 | Kochersberger et al. | 73/865.9 |
| 7,107,829 B2 * | 9/2006 | Tachiki | 73/115.01 |

OTHER PUBLICATIONS

Eugene A. Avallone, Etc., "Mark's Standard Handbook for Mechanical Engineers", 1996, pp. 8-35 and 8-36, McGraw Hill, New York.

* cited by examiner

*Primary Examiner* — Freddie Kirkland, III
(74) *Attorney, Agent, or Firm* — Husch Blackwell LLP

(57) ABSTRACT

A jointed flexible drive shaft assembly is provided. The drive shaft has at least one flexible joint comprising a yoke connecting two drive shaft components together in a flexible manner which permits angular offsetting of the axis of rotation of one shaft component relative to the axis of rotation of another shaft component while a pilot and pilot bore cooperate to maintain the axes of rotation fixed against relative lateral offset a predetermined amount. The drive shaft assembly may be used on a test stand to couple a driving element with a driven element thereby reducing the need for a precision alignment between the driving and driven elements.

38 Claims, 4 Drawing Sheets

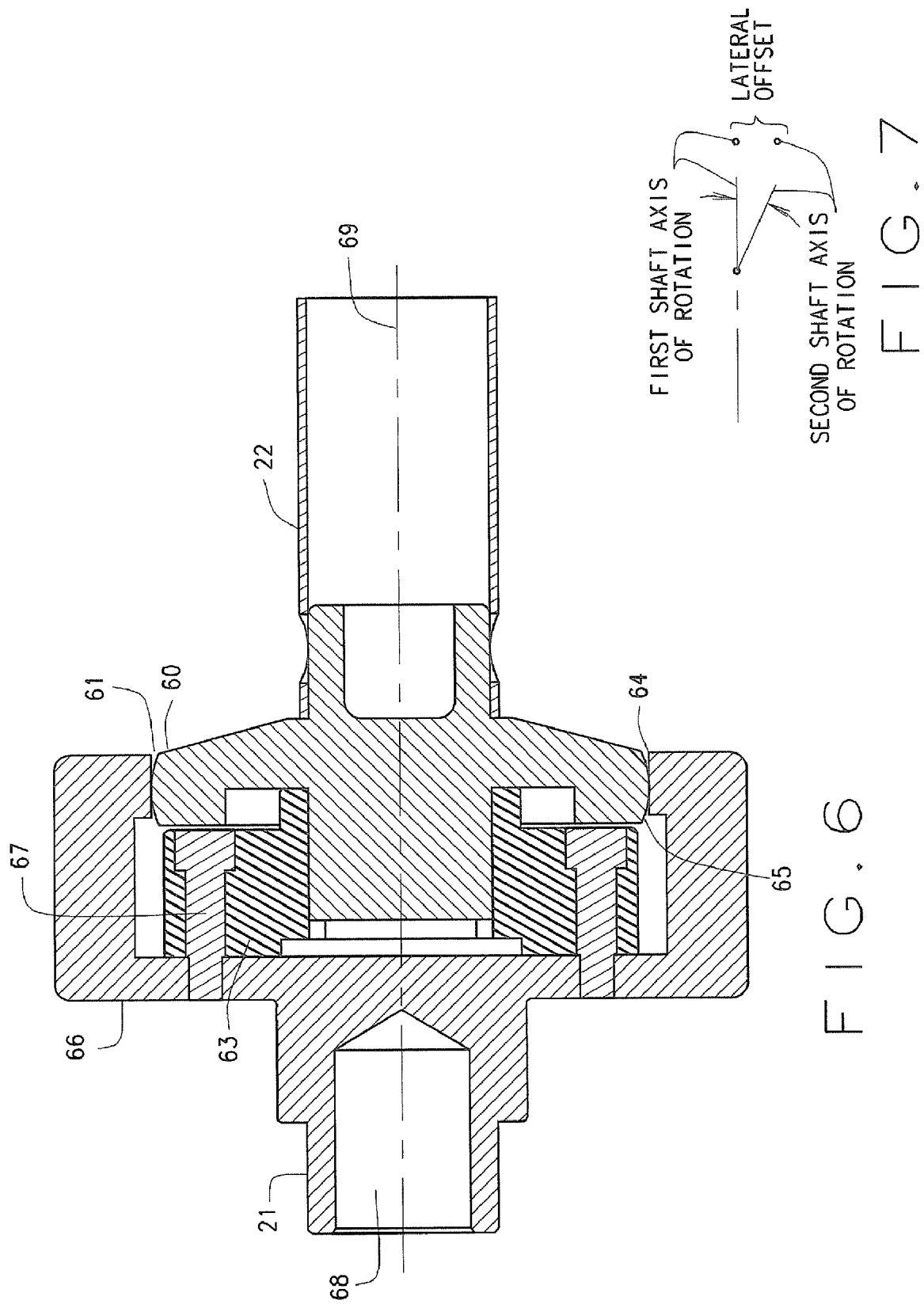

TEST STAND WITH JOINTED DRIVE SHAFT

BACKGROUND OF INVENTION

Drive shafts with flexible joints for non-linear shaft component orientation are well known in the art. It is not uncommon to find a drive shaft having one or more flexible joints often referred to as a universal joint, Cardon joint or a Hooke's joint. This allows for the drive shaft to move relative to a driving or a driven element and to permit shaft portions to be out of coaxial alignment, i.e., set at an angle relative to one another and still permit rotation of a driven element by a driving element. Such drive shafts can be found on automobiles and trucks to drive the differential, front wheel drives that have constant velocity (CV) joints, in machines, lawn mowers and the like. Some jointed drive shafts are used to connect a driving element, for example, an electric motor to a driven element for testing of the driven element for various factors such as vibration, torque requirements and the like.

During the testing of a driven element, it is oftentimes desirable to eliminate noise from the system in order to obtain more accurate sensor readings. Oftentimes this is done by subtracting the noise of the drive system out of the total noise to obtain the noise or other measurements from the driven element. Additionally, audible noise, i.e., noise that can be heard by humans or other animals, can also be generated which in some environments can, when added to other noise, lead to objectionable noise levels including noise levels in excess of those permitted by government regulation. Thus, noise can generate at least two types of problems, readings from sensors and the audible sound level in a given environment.

Many types of joints between drive shaft segments are known. For example, the standard universal joint used in automobile drive shafts (a double gimble construction), bellows joint, elastomeric joints, Oldham joints, Waldron couplings and the like. While these joints have been used successfully in many applications, there is a need for their improvement in flexible joints to reduce noise while still maintaining the flexibility of such joints.

Thus, there is a need for an improved flexible drive joint to connect drive shaft components together.

SUMMARY OF INVENTION

One aspect of the present invention involves the provision of a test stand utilizing a drive element, for example, an electric motor, a drive shaft arrangement with at least one flexible drive joint therein, and a driven element. The driving element may be mounted to an anchor bed having one or more hold downs for securing the driving element in place. The driven element may also be mounted to the bed with the drive shaft connecting the driving element to the driven element. The flexible joint connects two shaft portions together permitting the axis of rotation of one shaft portion to be non-coaxial with the axis of rotation of another portion of the drive shaft, i.e. an angular misalignment. The two shaft portions are connected in driving engagement with one another by a flexible joint with a flexible yoke so that rotation of one shaft portion will effect rotation of another shaft portion allowing angular misalignment between the centers or axes of rotation of the drive shaft portions. At least one pilot is provided on either the driven or the driving side of the flexible joint and is received in a pocket or bore in the other of the driving or driven element shaft portions to maintain the two drive shaft portions axes of rotation laterally fixed in position relative to one another while still permitting angular offset misalignment of the axes of rotation.

The present invention can utilize a test stand for mounting of the driving and driven elements and to permit their connection together by the drive shaft for permitting some degree of angular and lateral offset misalignment of the axes of rotation of a drive device in the driven element and the drive device in the driving element. The pilot may be a single pilot mounted to be coaxial with the rotation axis of either the driven or the driving element while the bore that receives the pilot is in coaxial alignment with the center rotation of the other of the driving element and driven element. The pilot and the bore are configured to permit the angular misalignment while maintaining any lateral offset of the driven and driving portions of the drive shaft a predetermined amount. The pilot may be centrally located or may be located radially outwardly from the center of rotation and radially outwardly of a yoke that connects the drive shaft components in driving relationship which yoke can be inside of a plurality of pilots or external of one or more pilots.

Another aspect of the present invention involves using the drive shaft assembly of the present invention in a wide variety of other applications.

BRIEF DESCRIPTION OF DRAWINGS

FIG. 6 is an enlarged sectional view of an alternate embodiment of the present invention.

FIG. 7 is a schematic illustration of drive shaft component misalignments.

Like numbers throughout the various figures represent like or similar parts and/or construction.

DETAILED DESCRIPTION

Figure 1:
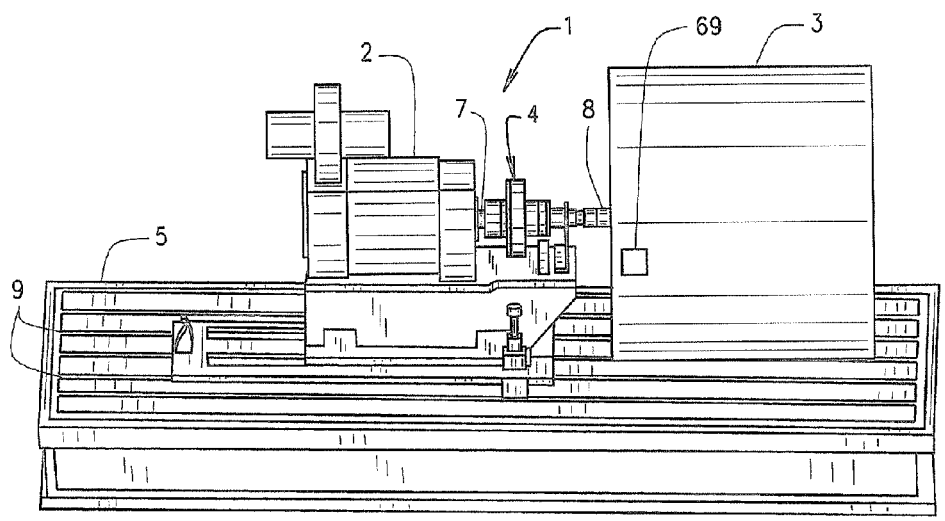
FIG. 1 is a perspective view of a test stand incorporating a driving element, a driven element and a connecting drive shaft.
Figure 2:
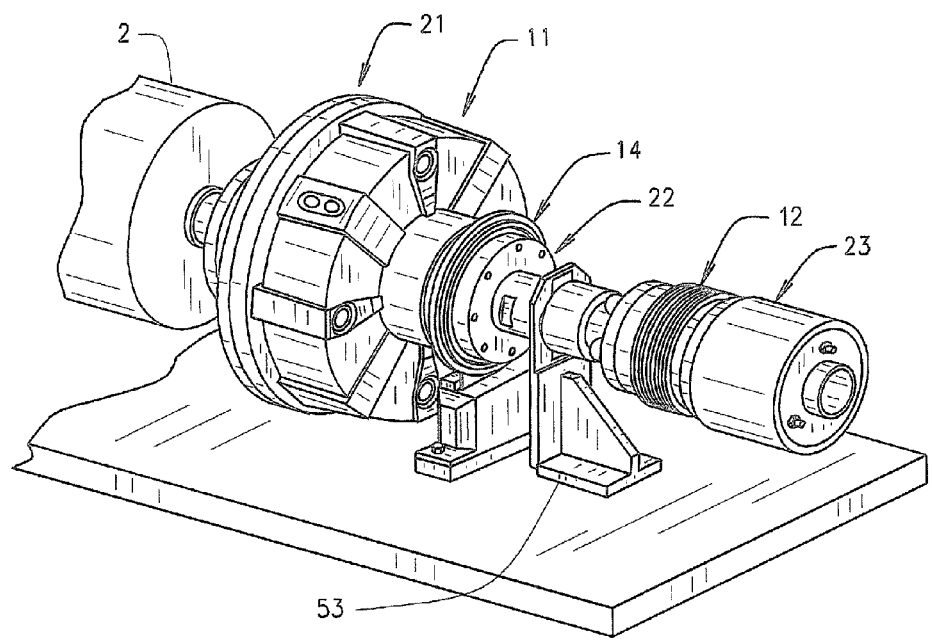
FIG. 2 is an enlarged perspective view of the drive shaft of FIG. 1.
Figure 3:
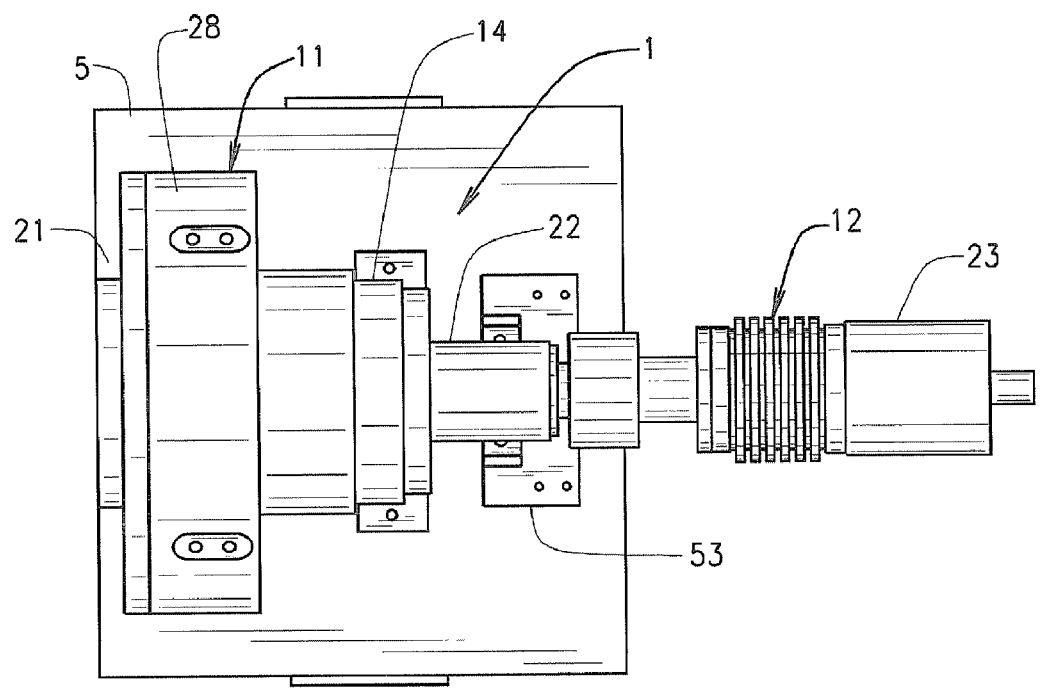
FIG. 3 is an enlarged plan view of the drive shaft.

The reference numeral 1 designates generally a test stand or apparatus having a driving element 2 and a driven element 3 that are connected in driving relationship by a drive shaft assembly 4. The driving element 2 and driven element 3 may be secured to an anchor bed 5 adapted for mounting the driving element 2 and driven element 3 thereon and to secure them in a position where their respective input and output shafts can be closely axially aligned. The stand 1 can be a dedicated stand for a particular combination of items or attachments may be provided for making the stand 1 more universal.

In the illustrated structure, the driving element 2 is an electric motor having its output shaft 7 connected to the drive shaft assembly 4. In the illustrated structure, the driven element 3 can be any suitable device, for example, an internal combustion engine having an input shaft 8 (for the purpose of testing). Numerous types of driven elements 3 may be provided as for example, car and truck differentials or axles, transaxles, machine elements, generators and the like.

The anchor bed 5 can be in the form of a bed having a plurality of elongate T slots 9 used for securing clamps in place to secure the driving element 2 and driven element 3 in position on the bed 5. The bed 5 may be made of any suitable material, e.g., cast iron, preferably malleable cast iron. It is to be understood however though, that any suitable bed 5 may be used. The bed 5 may be a permanent installation or a temporary installation or may be part of a floor structure or an elevated structure. Depending upon the type of driven device 3 being tested, the size of the bed 5 may be suitably selected as well as the output torque and power of the driving element or device 2.

The drive shaft assembly 4 has one or more flexible joints therein with each flexible joint being as described below. The drive shaft assembly 4 directly couples the driving element 2 to the driven element or device 3 preferably through only the drive shaft assembly 4 as described below. In the illustrated structure, the drive shaft assembly includes a pair of flexible joint assemblies designated generally 11 and 12. In the illustrated structure, a sensor 14 may be associated with the drive shaft assembly 4 with the sensor 14 being, e.g., a torque sensor, a vibration sensor or the like. A suitable torque sensor is, e.g., a torque or torsional acceleration sensor manufactured by ATI, PCB, HBM, or Lebow. The sensor 14 may be suitably secured to the bed 5 in a manner consistent with the construction of the sensor 14 and its functional coupling to the drive shaft. In the illustrated structure, the drive shaft assembly 4 has three flexibly coupled sections 21, 22 and 23. The section 21 is coupled to the driving element 2 and the section 23 is coupled to the driven element 3. The intermediate component 22 couples the components 21 and 23 together in driving relationship.

Figure 4:
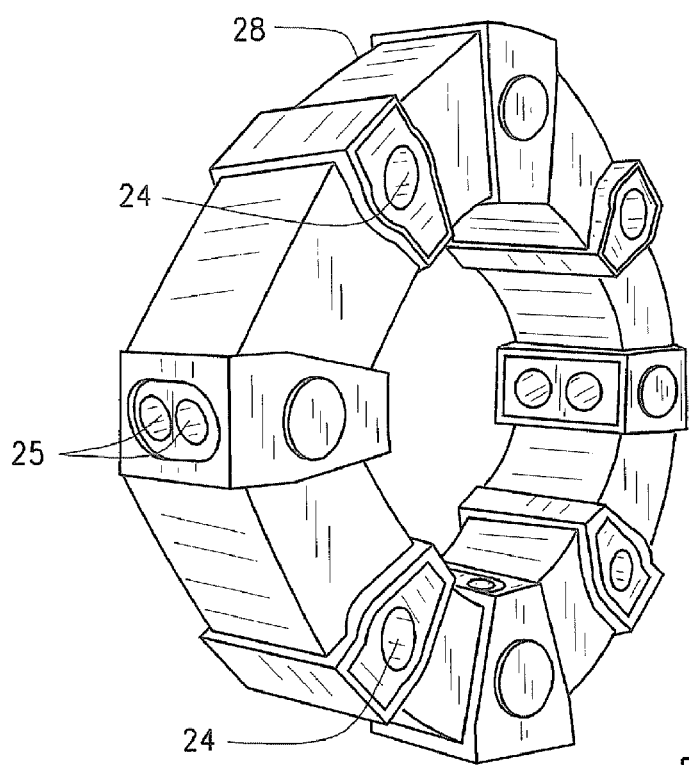
FIG. 4 is an enlarged perspective view of one form of coupling yoke.

In the illustrated structure, the input component 21 of the drive shaft assembly 4 is coupled to the output shaft 7 and includes a plate 26 having a keyed socket 27 for receipt of the shaft 7 therein to mount the drive shaft assembly 4 to the shaft 7 for positive rotation. The intermediate shaft component 22 is in turn coupled to the adapter 27 which is coupled in driving relation to a yoke 28. In the illustrated structure, the yoke 28 is in the form of a ring made of an elastomeric material with molded in metal inserts to provide the bores 24, 25, FIG. 4. The yoke 28 is secured to a plate 29 as with bolts 30 extending through bores 24. The yoke 28 is connected to the centering adapter 31 as with bolts (not shown) extending through bores 25. The joint assembly 11 is preferably balanced along with the other connected components to help reduce vibrations from being induced by the rotation of the shaft components 21, 22 and joint assembly 11. The centering adapter 31 is shown as being in the form of a generally tubular member having an end wall with a pilot receiving bore 35 which may be defined by a replaceable bearing 37.

A pilot 36 is received within the bore 35 in a manner that will permit some angular misalignment of the two shaft portions 21 and 22. As shown, the pilot 36 has a rounded end 38 mounted on a support shaft 32. The end 38 may be generally spherical, while the bore 35 is shown as being generally cylindrical. Other shapes of pilots 36 and bores 35 may be provided so long as some degree of angular misalignment of the shaft portions 21, 22 may be achieved while maintaining the centers of rotation of the shaft portions 21, 22 substantially fixed from relative lateral movement at the pivot point of the pilot 36 in the bore 35, which, in the illustrated structure will be on the end 38 during rotation of the drive shaft assembly 4. The angle A of deviation or misalignment of the two shaft portions 21, 22 is at least about 0.05° and preferably up to about 3° and more preferably up to about 5° for use on a test stand or at least about 5° when used in other applications such as a machine component or vehicle component. The diameter of the rounded pilot portion 38, the depth of its insertion into bore 35, the transverse size of shaft 32 and any bore open end chamfering will control the amount of permitted angular misalignment. The shaft 32 has a transverse size smaller than that of the bore 35 and the end 38 to permit angular misalignment. The pilot 36 and bore 35 cooperate to limit the shaft portions 21, 22 from relative lateral movement (FIG. 7) a predetermined amount at their junction, even though there can be some misalignment at the angle A as best seen in FIG. 7. Preferably, the relative lateral movement is limited to less than about 0.001 inches, more preferably less than about 0.0005 inches and most preferably less than about 0.0002 inches as will be determined by the gap between the end 38 and bearing 37 sidewall surface 39.

In the illustrated structure, the coupler 12 includes a bellows form of yoke 50 which permits the axial misalignment of shaft portions 22, 23 at an angle similar to that described above for shaft portions 21, 22. The yoke 50 may be of a metallic material. The use of the couplers 11 and 12, permit angular misalignment and/or lateral offset, as described above, of the axis of rotation of the driving element 2 and the axis of rotation of the driven element 3. The drive shaft assembly 4 does not need to be supported by other than the driving and driven elements 2, 3, respectively, but could be supported as with support 53. The coupler 12 has a centering device similar to that shown and described for the coupler 11 including a pilot 51 and bore 52 similar to pilot 36 and bore 35 as described above. The bellows 50 acts as a yoke as does the elastomeric ring of the yoke 28. By utilization of the pilot 51 and bore 52, and by controlling the clearance therebetween, the amount of noise generated or produced as compared to a standard drive shaft, can be greatly reduced. For example, a typical drive shaft has been known to generate about 100 dB's of audible noise whereas, the present invention provides a similarly sized drive shaft which generates less than about 60 dB's of audible noise thus making the machine more comfortable to be around. The inventive drive shaft assembly 4 can also reduce signal noise generated by operation of the drive shaft as it would be picked up by measuring sensors such as microphones, accelerometers, torque transducers, and laser vibrometers.

The above-described yoke and pilot arrangements are endo arrangements, i.e., the pilot or pilots are on the respective axes of rotation and/or inside of the yoke. FIG. 6 shows an alternative embodiment of the present invention where the pilot is not on the centerline of rotation of the drive shaft assembly 4 but rather spaced outwardly therefrom. In this alternate embodiment, the flexible joint assembly 59 has at least one pilot 60 and at least one pilot receiving bore 61. The yoke 63 is mounted radially inwardly of a surface 64 defining the bore 61. The yoke 63 can be similar in construction to the yoke 28 and can be secured to an adapter plate 66 as with bolts 67. A keyed shaft pocket 68 can be provided on the plate 66 for the mounting of the plate 66 to a drive shaft on either a driving or driven element 2, 3 respectively. The surfaces 64, 65 may be appropriately contoured to provide for axial misalignment as described above. The surface 65 will preferably have a radius approximately equal to the radial distance of the surface 65 from the axes of rotation 69 of the pilot 60. The surface 64 may be transversely radiused or generally cylindrical as desired. The gap between the surfaces 64, 65 will fix the pilot against lateral movement, as seen schematically in FIG. 7, by the amount of the gap. The difference between the flexible joint assembly 59 and the flexible joint assemblies 11 and 12 is that the pilot is not mounted on the centerline of the axes of rotation of either of the shaft portions 21, 22 or 23.

Surprisingly, by maintaining a centered relationship between the various segments of the drive shafts, through the use of the pilot and bore arrangement, the noise reduction of a draft shaft is between about 25 dB's and about 40 dB's. Additionally, sensor pickup noise has been reduced by about 50% for a linear sensor. The present invention provides for a drive shaft arrangement that allows for angular misalignment of two shaft components from parallel (0°) (coaxial) to an angle A as described above. The use of the drive shaft of the present invention permits quicker setup of a test apparatus to test a driven element 3 by a driving element 2 because their axes of rotation being in substantially perfect alignment is no longer necessary to achieve reduced noise operation.

The sensor 14 and/or a sensor 69 operably associated with the driven element 3 provides a respective output signal indicative of an operating parameter of the driven element.

While the present invention is illustrated as being used in a test stand, a drive shaft 4 of the present invention can also be used in a wide variety of other applications and environments such as a substitute for a standard drive shaft, for example, those found in an automobile drive train, as a substitute for a constant velocity or CV joint, as machine drive elements such as those found in manufacturing machines, lawn mowers, heavy duty mowers and the like.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present invention will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

The invention claimed is:

1. A test stand adapted for having a power drive element drive a driven element, the test stand comprising:
   a power drive element mounted to an anchor bed; and
   a drive shaft assembly coupled at one end to the power drive element and at the other end to a driven element, where said drive shaft assembly is operable for effecting driving of the driven element by the power drive element, said drive shaft assembly including:
      first and second shaft portions, said first shaft portion having a first longitudinal axis of rotation and the second shaft portion having a second longitudinal axis of rotation, and one of said first shaft portion and said second shaft portion having at least one first pilot member and the other of said first shaft portion and said second shaft portion having at least a first bore for receiving said first pilot member therein, thereby fixing the first and second longitudinal axes of rotation against lateral offset at a pivot point of the first pilot member a predetermined amount; and
      a first yoke extending between and connecting the first and second shaft portions together for simultaneous rotation, where said first yolk is driven by said first shaft portion and has sufficient flexibility to drive the second shaft portion where the first and second longitudinal axes of rotation are at an angle of misalignment of at least about 0.05°.

2. The test stand of claim 1 wherein the pilot member having a rounded free end portion fixed on a pilot shaft.

3. The test stand of claim 2 wherein the at least one bore having a generally cylindrical portion receiving the rounded free end portion and a portion of the pilot shaft.

4. The test stand of claim 3 wherein the pilot shaft being secured to the first shaft portion and having a cross section smaller than the rounded free end portion.

5. The test stand of claim 4 wherein the rounded free end portion having a generally spherical exterior surface portion.

6. The test stand of claim 1 including, a sensor operably associated with a portion of the drive shaft assembly and operable to provide an output signal representative of a characteristic of a driven element.

7. The test stand of claim 6 wherein the sensor including a torque sensor.

8. The test stand of claim 1 including a driven element coupled to the drive shaft assembly.

9. The test stand of claim 8 including a sensor operably associated with the driven element and operable to provide an output signal representative of a characteristic of the driven element.

10. The test stand of claim 1 including a third shaft portion with a third longitudinal axis of rotation and a second yoke connecting the second and third shaft portions together for simultaneous rotation, said second yoke having sufficient flexibility to permit the second and third shaft longitudinal axes of rotation to be at an angle of at least about 0.05°.

11. The test stand of claim 10 wherein one of the second and third shaft portions having at least one second pilot member and the other of the second and third shaft portions having at least one pilot receiving second bore with a respective second pilot member received therein holding the second and third longitudinal axes against lateral offset at a pivot point of the second pilot member a predetermined amount.

12. The test stand of claim 1 including a single said first pilot member.

13. The test stand of claim 12 wherein said first pilot member having a central longitudinal axis substantially coaxial with the first longitudinal axis.

14. The test stand of claim 13 wherein the first yoke being positioned radially outwardly of the pilot member.

15. The test stand of claim 14 wherein the first yoke including a bellows member.

16. The test stand of claim 14 wherein the first yoke including an elastomeric ring.

17. The test stand of claim 11 wherein the third shaft portion including a second connector element adapted to be connected to a driven element.

18. The test stand of claim 1 wherein the first pilot member having a portion radially outwardly of the first yoke.

19. The test stand of claim 18 wherein the first bore being radially outwardly of the first pilot member.

20. The test stand of claim 19 wherein an outer perimeter of the first pilot member having a generally spherical surface portion and, the first bore having a generally cylindrical surface, said outer perimeter and generally cylindrical surface cooperating to limit relative lateral movement between the first and second longitudinal axes of rotation.

21. A drive shaft assembly comprising:
   first and second shaft portions with the first shaft portion having a first connector element, said first shaft portion having a first longitudinal axis of rotation and the second shaft portion having a second longitudinal axis of rotation;
   a first yoke extending between and connecting the first and second shaft portions together for simultaneous rotation, where said first yolk is driven by said first shaft portion and has sufficient flexibility to drive the second shaft portion where the first and second longitudinal axis are at an angle of at least about 0.05°; and one of said first shaft portion and said second shaft portion having at least one first pilot member and the other of said first shaft portion and said second shaft portion having at least a first bore for receiving said first pilot member therein, thereby fixing the first and second longitudinal axes against lateral offset at a pivot point of the first pilot member a predetermined amount.

22. The drive shaft assembly of claim 21 wherein the pilot member having a rounded free end portion fixed on a pilot shaft.

23. The drive shaft assembly of claim 22 wherein the at least one bore having a generally cylindrical portion receiving the rounded free end portion and a portion of the pilot shaft.

24. The drive shaft assembly of claim 23 wherein the pilot shaft being secured to the first shaft portion and having a cross section smaller than the rounded free end portion.

25. The drive shaft assembly of claim 24 wherein the rounded free end portion having a generally spherical exterior surface portion.

26. The drive shaft assembly of claim 21 including a sensor operably associated with a portion of the drive shaft assembly and operable to provide an output signal representative of a characteristic of a driven element when connected to the drive shaft assembly.

27. The drive shaft assembly of claim 26 wherein the sensor including a torque sensor.

28. The drive shaft assembly of claim 26 including a third shaft portion with a third longitudinal, axis of rotation and a second yoke connecting the second and third shaft portions together for simultaneous rotation, said second yoke having sufficient flexibility to permit the second and third shaft longitudinal axes of rotation to be at an angle of at least about 0.05°.

29. The drive shaft assembly of claim 28 wherein one of the second and third shaft portions having at least one second pilot member and the other of the second and third shaft portions having at least one pilot receiving second bore with a respective second pilot member received therein holding the second and third longitudinal axes against lateral offset at a pivot point of the second pilot member a predetermined amount.

30. The drive shaft assembly of claim 21 including a single said first pilot member.

31. The drive shaft assembly of claim 30 wherein said first pilot member having a central longitudinal axis substantially coaxial with the first longitudinal axis.

32. The drive shaft assembly of claim 31 wherein the first yoke being positioned radially outwardly of the pilot member.

33. The drive shaft assembly of claim 32 wherein the first yoke including a bellows member.

34. The drive shaft assembly of claim 33 wherein the first yoke including an elastomeric ring.

35. The drive shaft assembly of claim 29 wherein the third shaft portion including a second connector element adapted to be connected to a driven element.

36. The drive shaft assembly of claim 21 wherein the first pilot member having a portion radially outwardly of the first yoke.

37. The drive shaft assembly of claim 36 wherein the first bore being radially outwardly of the first pilot member.

38. The drive shaft assembly of claim 37 wherein an outer perimeter of the first pilot member having a generally spherical surface portion and the first bore being generally cylindrical surface, said outer perimeter and generally cylindrical surface cooperating to limit relative movement between the first and second longitudinal axes of rotation.

* * * * *

UNITED STATES PATENT AND TRADEMARK OFFICE
CERTIFICATE OF CORRECTION

| | | |
|---|---|---|
| PATENT NO. | : 7,980,123 B2 | |
| APPLICATION NO. | : 11/754109 | |
| DATED | : July 19, 2011 | |
| INVENTOR(S) | : Robert Lynn Ussery | |

Figure 5:
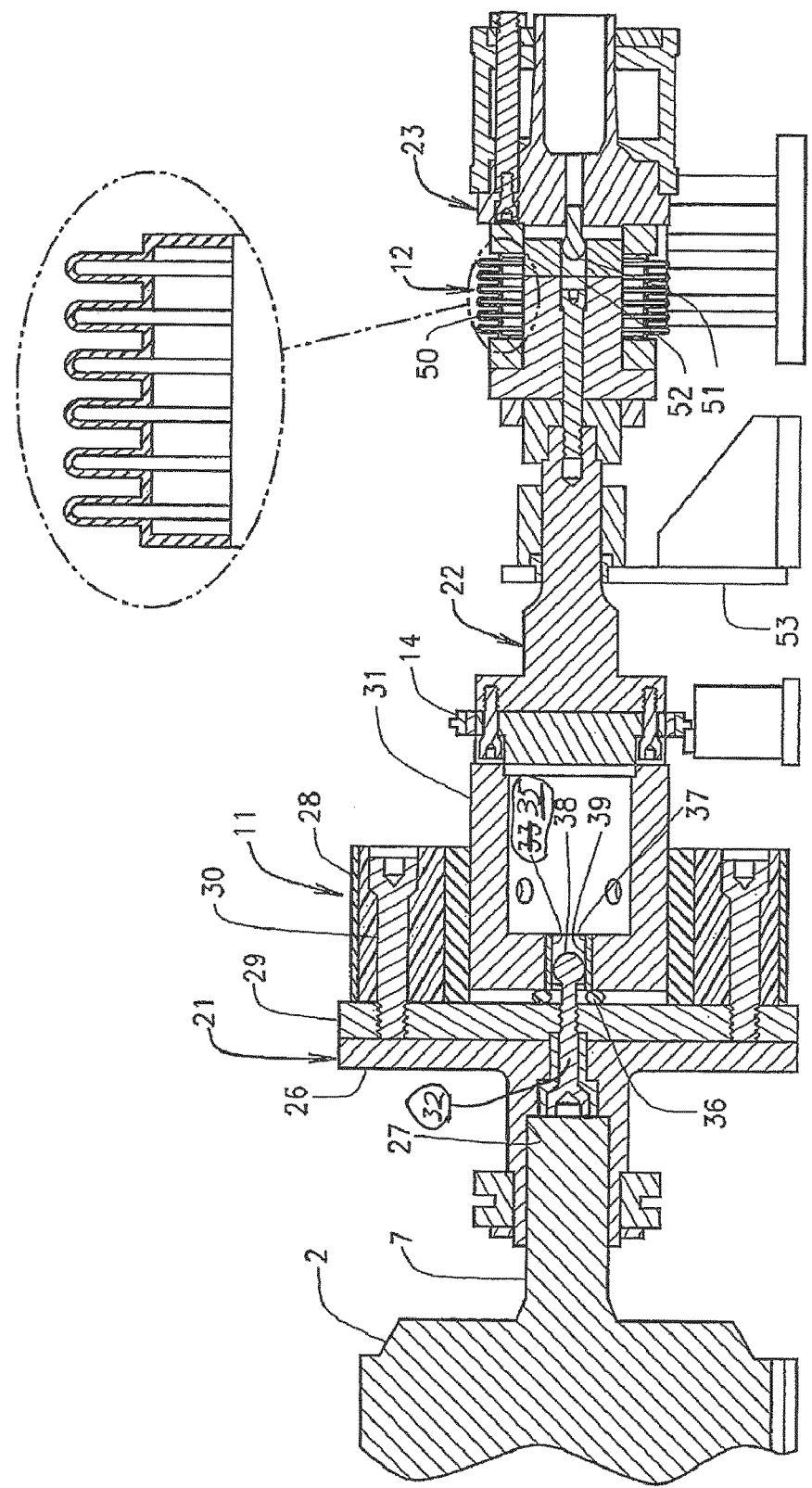
FIG. 5 is an enlarged sectional view of the drive shaft showing a portion thereof further enlarged for detail.
Figure 5:
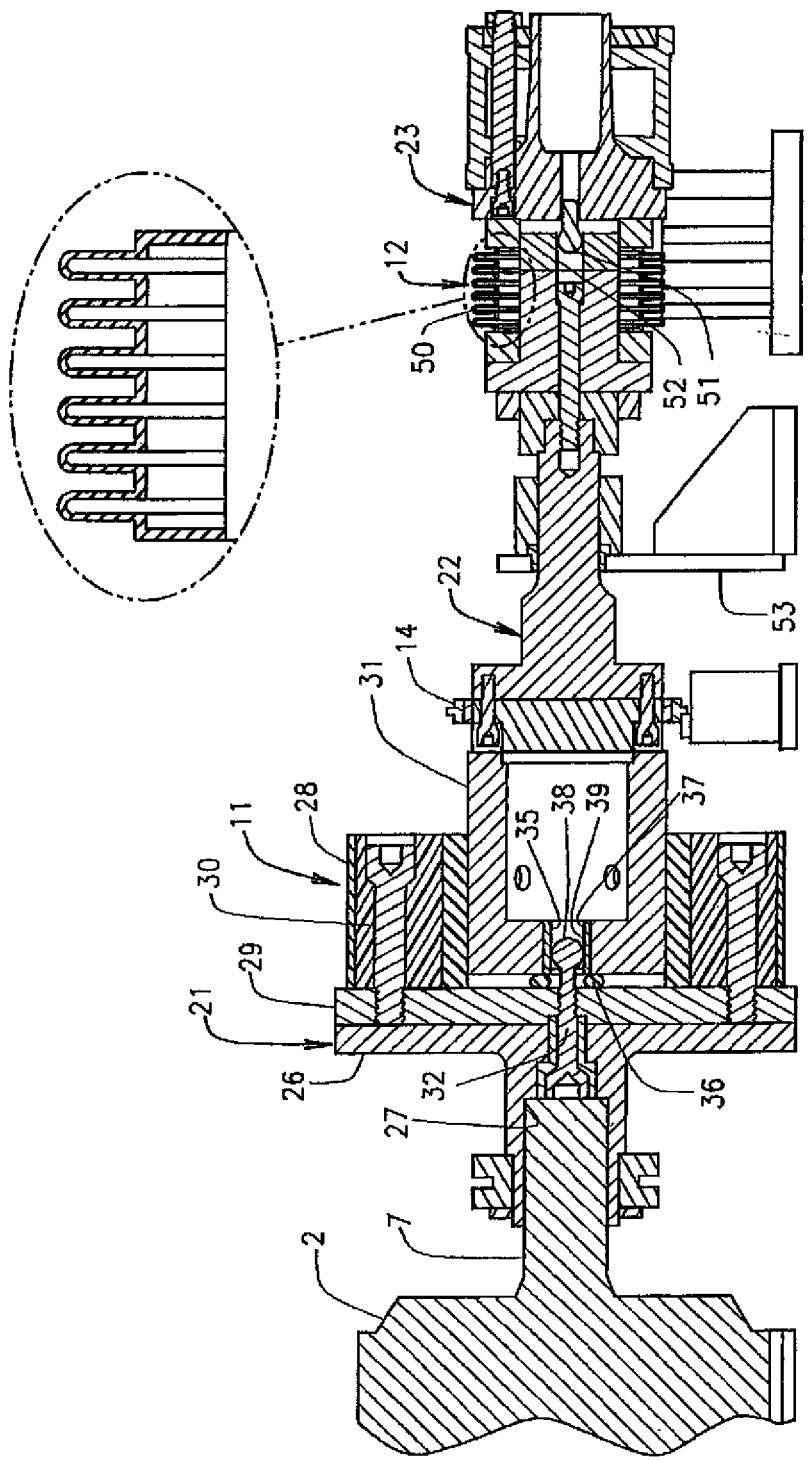

It is certified that error appears in the above-identified patent and that said Letters Patent is hereby corrected as shown below:

IN THE DRAWINGS:

Delete Fig. 5 and replace with attached Fig. 5

Signed and Sealed this
Twenty-eighth Day of February, 2012

David J. Kappos
*Director of the United States Patent and Trademark Office*